United States Patent
Singer

(10) Patent No.: US 7,041,020 B2
(45) Date of Patent: May 9, 2006

(54) DEFLECTION PULLEY FOR A TRACTION MECHANISM DRIVE

(75) Inventor: Johann Singer, Grossenseebach (DE)

(73) Assignee: INA Wälzlager Schaeffler OHG, Herzogenaurach (DE)

( * ) Notice: Subject to any disclaimer, the term of this patent is extended or adjusted under 35 U.S.C. 154(b) by 101 days.

(21) Appl. No.: 10/363,212

(22) PCT Filed: Jul. 14, 2001

(86) PCT No.: PCT/EP01/08135

§ 371 (c)(1),
(2), (4) Date: Jun. 30, 2003

(87) PCT Pub. No.: WO02/21005

PCT Pub. Date: Mar. 14, 2002

(65) Prior Publication Data

US 2004/0097313 A1    May 20, 2004

(30) Foreign Application Priority Data

Sep. 6, 2000 (DE) ............................... 100 43 840

(51) Int. Cl.
*F16H 7/12* (2006.01)
(52) U.S. Cl. ...................................... 474/166; 474/152
(58) Field of Classification Search .............. 474/101, 474/112, 133, 135, 152, 166; 384/546, 547
See application file for complete search history.

(56) References Cited

U.S. PATENT DOCUMENTS

| | | | |
|---|---|---|---|
| 4,557,653 A | 12/1985 | Hill | |
| 5,244,325 A | 9/1993 | Knohl | |
| 5,601,504 A * | 2/1997 | Rocca et al. | 474/91 |
| 5,662,444 A | 9/1997 | Schmidt, Jr. | |
| 6,241,257 B1 * | 6/2001 | Hauck et al. | 277/637 |
| 6,357,926 B1 * | 3/2002 | Hauck et al. | 384/546 |

FOREIGN PATENT DOCUMENTS

| | | |
|---|---|---|
| DE | 84 29 897 U1 | 1/1985 |
| DE | 196 53 925 A | 7/1997 |
| DE | 297 20 776 U | 1/1998 |
| DE | 198 36 191 A | 2/2000 |
| EP | 1 061 278 A | 12/2000 |

* cited by examiner

*Primary Examiner*—Vicky A. Johnson
(74) *Attorney, Agent, or Firm*—Henry M. Feiereisen

(57) ABSTRACT

The invention relates to a deflection pulley (1), intended for a traction drive, which includes a rolling-contact bearing as well as a ring body (4). A securing screw (8) as well as a spacer sleeve (9) serve as retaining elements. In order to provide a transport safety system (17), the spacer sleeve (9) is provided with at least one radial inwardly directed projection (18) which radially overlaps a threaded section (20) of the securing screw (8).

20 Claims, 1 Drawing Sheet

DEFLECTION PULLEY FOR A TRACTION MECHANISM DRIVE

FIELD OF THE INVENTION

The invention relates to a deflection pulley for deflecting a traction member, in particular a V-ribbed belt or a toothed belt of a traction drive. The deflection pulley includes a rolling-contact bearing with a non-rotatable inner ring and a rotating outer ring. The outer ring is hereby surrounded by a ring body which forms a pulley shell and has an outer surface area for guiding the traction member. Retainers and fasteners form together with the deflection pulley a unitary structure by means of a transport safety system.

BACKGROUND OF THE INVENTION

DE 297 20 776 discloses a deflection pulley having a grooved ball bearing which is surrounded on the outside by a molded-on pulley shell of plastic. The deflection pulley is secured by retainers comprised of a sealing disk and a screw which has a guide section received in the inner ring of the rolling-contact bearing of the deflection pulley. The outer circumference of the sealing disk forms at a same time a seal for the rolling-contact bearing. Provided in the center of the sealing disk is a cup-shaped stamped-in area having a cylindrical portion pressed into the bore of the inner ring of the rolling-contact bearing. The central bore of the sealing disk is provided to receive the guide section of the securing screw. The screw head is supported by an end surface of the inner ring by way of the sealing disk. The guide section extending from the screw head is provided to center the screw with respect to the inner ring of the rolling-contact bearing. To hold the retaining member captive and to secure it for transport, the sealing disk is provided adjacent the stamped-in area with elastic tongues distributed around the periphery and pressing at a slant in the axial/radial direction against the shaft of the securing screw. This transport safety system thus includes a sealing disk of complex configuration which incurs not only high manufacturing costs but complicates the installation.

SUMMARY OF THE INVENTION

Considering the drawbacks of the known solution, the object of the present invention is to provide a transport safety system which is cost-optimized and can easily be assembled while ensuring at the same time an effective captivation.

This object is attained in accordance with the invention by providing a spacer sleeve which is associated to the deflection pulley and formed with a through bore to receive the fastening screw and which includes a radially inwardly directed projection by which the fastening screw is secured in a force-fitting manner. Unlike the known prior art, this transport safety system according to the invention does not require an additional component and can be realized in a cost-efficient manner by means of a simple material shaping process. Moreover, the transport safety system according to the invention does not adversely affect in any way the assembly. Through appropriate configuration of the radial projection or several radial projections, the transport safety system according to the invention ensures further a positioning of the fastening screw in the spacer sleeve in correspondence with the installation position in the deflection pulley. This measure simplifies installation of the entire deflection pulley and permits at the same time an automated assembly of the deflection pulley as a consequence of the prefabricated arrangement of the fastening screw, including all retaining elements.

A further advantageous configuration of the invention involves the provision of radial projections distributed in symmetry about the circumference of the spacer sleeve. This measure improves the centered disposition of the fastening screw in the spacer sleeve.

Furthermore, the invention includes a spacer sleeve which has radial projections for implementing a force-fitting connection by extending them up to the outer surface area of the screw shaft. In this way, a clearance-free disposition of the fastening screw in the spacer sleeve can be ensured, accompanied with an exact alignment of the fastening screw in relation to the spacer sleeve. The force-fitting transport safety system provides at the same time for an improved positional fixation of all retaining elements during the transport and assembly of the entire unitary structure. Without additional components, a sufficient union of all retaining elements of the deflection pulley is ensured. The slightly increased tightening moment of the fastening screw as a consequence of the spot pressure applied radially on the screw shaft by the projections may, optionally, be compensated or corrected through a respectively increased tightening moment of the fastening screw.

The arrangement of the spacer sleeve and the fastening screw is so provided as to support the screw head of the fastening screw and the spacer sleeve on opposite end surfaces of the inner ring of the rolling-contact bearing. The fastening screw is hereby centered by the guide section press-fitted in the inner ring of the rolling-contact bearing as well as on the projections of the spacer sleeve via the screw section so that the installation position of the fastening screw is defined at the same time.

A further advantageous configuration of the invention provides an arrangement of the radial projections in a recess which is arranged in axially offset relationship to the end surface of the spacer sleeve. The position avoids any influence by the radial projections upon the terminal support surface of the spacer sleeve for example on a tension arm or on a contact surface of the internal combustion engine.

According to a further configuration of the invention, the spacer sleeve is designed as cast article and configured to include as blank already radial projections. A finished spacer sleeve that has been cast in this way saves a working step by which the projections have to be molded on through a swaging process. Fastening screws are used for such designed spacer sleeves with a shaft diameter which exceeds the diameter in the area of the threaded section.

Preferably, the radial projections have a half-round cross sectional shape. This shape is implemented through the use of respective tools by which material is shaped at an end surface of the spacer sleeve in the area of the central bore. The invention also includes projections of different design, of different geometric shape. The position of the radial projections enables their placement into the spacer sleeve after installation of the fastening screw, e.g. by means of a lathe center or other tool.

The spacer sleeve according to the invention is preferably made of aluminum or an aluminum alloy. As an alternative, the use of a spacer sleeve of steel may also be used, whereby a cutting or non-cutting manufacturing process may be applied.

BRIEF DESCRIPTION OF THE DRAWINGS

The invention will now be described in more detail with reference to the drawings, in which.

DETAILED DESCRIPTION OF THE DRAWINGS

Figure 1:
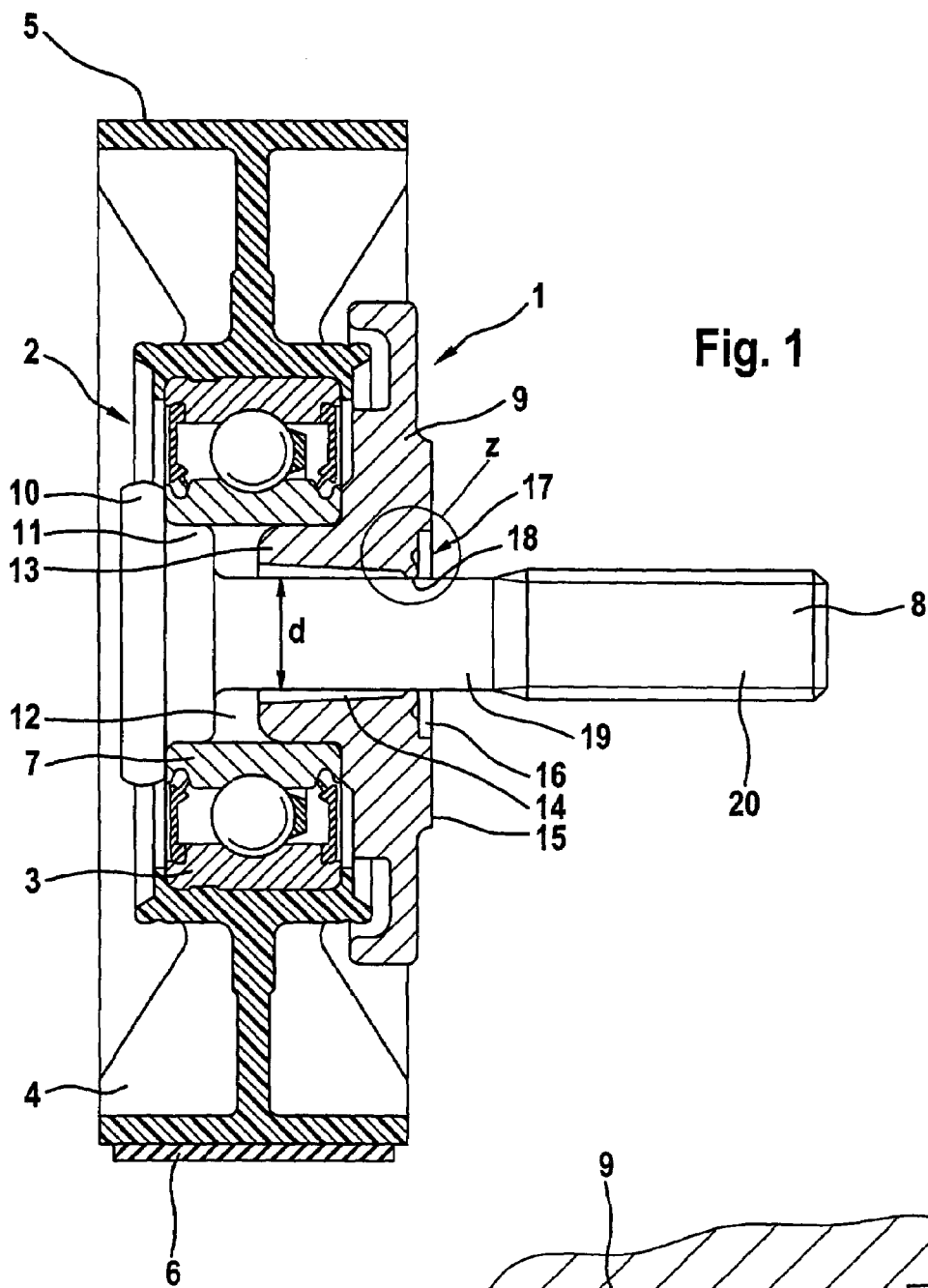
FIG. 1 shows a longitudinal section of a deflection pulley which has integrated therein the transport safety system according to the invention.

The deflection pulley depicted in FIG. 1 includes a rolling-contact bearing 2 which is constructed as grooved ball bearing and has an outer ring 3 which is surrounded by a ring body 4 made of plastic. Guided on an outer surface area 5 of the ring body 4 is a traction member 6, constructed as V-ribbed belt. An inner ring 7 of the rolling-contact bearing 2 is connected with a retainer comprised of a fastening screw 8 as well as a spacer sleeve 9. The fastening screw 8 is supported via a screw head 10 on an end surface of the inner ring 7. A guide section 11 is placed axially adjacent to the screw head 10 and press-fitted in a central bore 12 of the inner ring 7. The spacer sleeve 9 is supported by the inner ring 7 on its end surface which is opposite to the screw head 10, whereby the spacer sleeve 9 has a guide collar 13 for centering on the inner ring 7 as well. The spacer sleeve 9 is provided with a through bore 14 for the fastening screw 8. On its end surface 15, which is distal to the rolling-contact bearing 2, the spacer sleeve 9 is stepped in the area of the through bore 14 and forms an axially offset recess 16.

In order to realize a transport safety system 17, which also serves to secure the assembly, the spacer sleeve 9 is provided with several circumferentially distributed projections 18 which extend radially in the direction of the fastening screw 8. These projections 18, preferably farmed through material shaping, are associated to a screw shaft 19 of the fastening screw 8 and radially overlap a threaded section 20. As can be seen from FIG. 1, the fastening screw 8 has a screw shaft 19 with a diameter "d" which is smaller than the threaded section 20 of the fastening screw 8. As a result, a radial overlap is established between the transport safety system 17 and the threaded shaft 20 to effectively captivate the fastening screw. The radial projections 18 provided for the transport safety system 17 are introduced into the spacer sleeve 9 after the fastening screw 8 has been mounted. It is possible to cast a spacer sleeve 9, constructed as cast article, with projections 18. The finally cast spacer sleeve 9 thus requires no finishing operation In order to realize the transport safety system.

Figure 2:
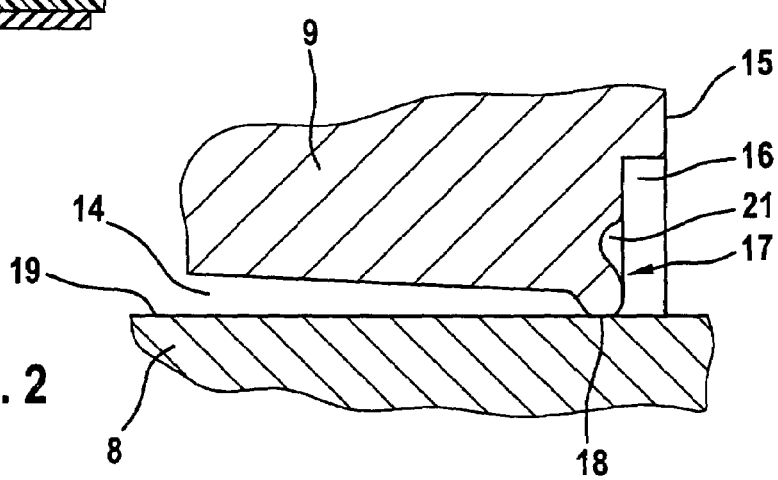
FIG. 2 is an enlarged detailed illustration of an area marked "z" in FIG. 1.

FIG. 2 shows more clearly the arrangement of the radial projections 18 by way of an enlarged illustration of the detail "z" in FIG. 1. Accordingly, the radial projection 18 is extended up to the screw shaft 19 of the fastening screw 8 and forms hereby a force-fitting connection or a press-fitted union. Thus, an intended positioning of The fastening screw 8 in relation to the spacer sleeve 9 and thus of the deflection pulley 1 is ensured, thereby simplifying the installation of the entire deflection pulley 1, for example to an internal combustion engine. FIG. 2 shows moreover a swaging 21 configured as a half-round recess on the spacer sleeve 9 for formation of the projection 18, by means of a local shaping of material. The radial projection 18 rests against the outer surface area of the fastening screw 8 in a force-fitting manner by way of a spot contact or line contact. As a consequence of the material elasticity and different material strength between the spacer sleeve 9, made preferably of aluminum, and the fastening screw 8 of steel, the projection 18 conforms to the outer surface area of the fastening screw 8 and deforms hereby. The force-fitting connection of the radial projections 18 on the screw shaft 19 effects a secure union of all components of the deflection pulley 1. This transport safety system 17 ensures integrity of all components of the deflection pulley 1 even during transport and enables a simplified assembly.

LIST OF REFERENCE NUMERALS 1 deflection pulley
2 rolling-contact bearing
3 outer ring
4 ring body
5 outer surface area
6 traction member
7 inner ring
8 fastening screw
9 spacer sleeve
10 screw head
11 guide section
12 bore
13 guide collar
14 through bore
15 end surface
16 recess
17 transport safety system
18 projection
19 screw shaft
20 threaded section
21 swaging

What is claimed is:

1. Deflection pulley (1) associated to a traction drive, comprising:
    a rolling-contact bearing (1) with a non-rotatable inner ring (7) and a rotating outer ring (3), which
    is surrounded by a ring body (4) having an outer surface area (5) for guiding a traction member (6), and
    retaining means such as a fastening screw (8) received in the inner ring (7) for joining by means of a transport safety system (17) the deflection pulley (1) together with a spacer sleeve (9) to form a unitary structure, wherein the spacer sleeve (9) is provided as transport safety system with at least one radial inwardly directed projection (18) which secures the fastening screw (8) in a force-fitting manner, wherein the fastening screw has a screw head, said spacer sleeve having an end surface which is distal to the screw head and formed with a recess, said radial projection being arranged axially inwardly adjacent to the recess so that the end surface has a stepped configuration.

2. Deflection pulley according to claim 1, wherein the spacer sleeve (9) is provided with radial projections (18) symmetrically distributed about the circumference.

3. Deflection pulley according to claim 2, wherein the radial projections (18) rest in a force-fitting manner on an outer surface area of a screw shaft (19) of the fastening screw (8).

4. Deflection pulley according to claim 3, wherein the radial projections rest against the outer surface area of the screw shaft by way of a spot contact or line contact, wherein the outer surface area is smooth.

5. Deflection pulley according to claim 1, wherein the fastening screw (8) is centered in the area of the screw head

(10) by a guide section (11) press-fitted in the inner ring (7) of the rolling-contact bearing (2).

6. Deflection pulley according to claim 1, wherein the spacer sleeve (9) is configured as cast article and provided as blank with radial projections (18).

7. Deflection pulley according to claim 1, wherein the radial projections (18) are provided in the spacer sleeve (9), after mounting the fastening screw (8), by means of a material shaping process through swaging.

8. Deflection pulley according to claim 1, wherein the radial projections (18) have a cross section of substantially half-round shape.

9. Deflection pulley according to claim 1, wherein the spacer sleeve (9) is made of aluminum or an aluminum alloy.

10. Deflection pulley according to claim 1, wherein a screw head (10) of the fastening screw (8) and the spacer sleeve (9) are supported on opposite end surfaces of the inner ring (7) of the rolling-contact bearing, and the transport safety system (17) defines an installation position of the fastening screw (8).

11. A deflection pulley for a traction drive, comprising:
a rolling-contact bearing having an inner ring and an outer ring;
a ring body arranged in surrounding relationship to the rolling-contact bearing and having an outer surface area for guiding a traction member;
a fastening screw for placement though a bore of the inner ring, said fastening screw having a screw shaft, wherein the fastening screw has a screw head, said spacer sleeve having an end surface which is distal to the screw head and formed with a recess, said radial projection being arranged axially inwardly adjacent to the recess so that the end surface has a stepped configuration; and
a spacer sleeve received in the bore of the inner ring and provided with at least one radial inwardly directed projection to secure the fastening screw in place, said radial projection being so constructed as to be urged against an outer surface area of the screw shaft.

12. The deflection pulley of claim 11, wherein the spacer sleeve has a circumference and is provided with a plurality of said radial projection evenly distributed about the circumference of the spacer sleeve.

13. The deflection pulley of claim 11, wherein the fastening screw has a screw head and a guide section which is arranged adjacent to the screw head and press-filled in the bore of the inner ring to thereby center the fastening screw.

14. The deflection pulley of claim 11, wherein the spacer sleeve has a conical through bore for passage of the fastening screw, said through bore tapering toward the radial projection.

15. The deflection pulley of claim 11, wherein the radial projection has a cross section of substantially half-round shape.

16. The deflection pulley of claim 11, wherein the spacer sleeve is made of aluminum or an aluminum alloy.

17. The deflection pulley of claim 11, wherein the radial projection juts out at an angle toward the screw head distal end surface of the spacer sleeve.

18. The deflection pulley of claim 11, wherein the fastening screw has a screw shaft, said radial projection being so constructed as to be urged against an outer surface area of the screw shaft.

19. The deflection pulley of claim 11, wherein the fastening screw has a screw head which is supported on one end surface of the inner ring, said spacer sleeve being supported on an opposite end surface of the inner ring.

20. The deflection pulley of claim 11, wherein the radial projection rests against a smooth outer surface area of the screw shaft by way of a spot contact or line contact.

* * * * *